United States Patent
Yanagi et al.

(10) Patent No.: US 9,737,871 B2
(45) Date of Patent: Aug. 22, 2017

(54) GRANULAR ACTIVATED CARBON HAVING MANY MESOPORES, AND MANUFACTURING METHOD FOR SAME

(71) Applicant: Osaka Gas Chemicals Co., Ltd., Osaka (JP)

(72) Inventors: Juichi Yanagi, Osaka (JP); Noriko Matsumoto, Osaka (JP)

(73) Assignee: Osaka Gas Chemicals Co., Ltd., Osaka (JP)

( * ) Notice: Subject to any disclaimer, the term of this patent is extended or adjusted under 35 U.S.C. 154(b) by 0 days.

(21) Appl. No.: 14/768,982

(22) PCT Filed: Feb. 14, 2014

(86) PCT No.: PCT/JP2014/053554
§ 371 (c)(1),
(2) Date: Aug. 19, 2015

(87) PCT Pub. No.: WO2014/129410
PCT Pub. Date: Aug. 28, 2014

(65) Prior Publication Data
US 2015/0375197 A1    Dec. 31, 2015

(30) Foreign Application Priority Data

Feb. 20, 2013  (JP) .................................. 2013-031210

(51) Int. Cl.
*B01J 20/20* (2006.01)
*C01B 31/10* (2006.01)
(Continued)

(52) U.S. Cl.
CPC ......... *B01J 20/20* (2013.01); *B01J 20/28011* (2013.01); *B01J 20/28073* (2013.01);
(Continued)

(58) Field of Classification Search
CPC B01J 20/20; B01J 20/28073; B01J 20/28011; B01J 20/3078; B01J 20/3064; C01B 31/125
See application file for complete search history.

(56) References Cited

U.S. PATENT DOCUMENTS

2002/0114126 A1 * 8/2002 Hirahara ............... C01B 31/081
  361/302
2003/0179537 A1   9/2003 Tanaka et al.
(Continued)

FOREIGN PATENT DOCUMENTS

CN         102056842        5/2011
EP          2960206         12/2015
(Continued)

OTHER PUBLICATIONS

English machine translation of JP2009-298668.*
(Continued)

*Primary Examiner* — Richard M Rump
(74) *Attorney, Agent, or Firm* — McCarter & English, LLP (57) ABSTRACT

Provided is a granular activated carbon having many mesopores that can be used for applications similar to sine chloride-activated carbons, and also provided is a method for manufacturing the same. The granular activated carbon is obtained by bringing an activated carbon into contact with a calcium component, followed by activation and washing.

13 Claims, 1 Drawing Sheet

(51) Int. Cl.
    *B01J 20/28*     (2006.01)
    *B01J 20/30*     (2006.01)
    *C01B 31/12*     (2006.01)

(52) U.S. Cl.
    CPC ....... *B01J 20/3064* (2013.01); *B01J 20/3078* (2013.01); *C01B 31/10* (2013.01); *C01B 31/125* (2013.01)

(56) References Cited

U.S. PATENT DOCUMENTS

| | | | |
|---|---|---|---|
| 2012/0085708 A1* | 4/2012 | Redding | C01B 31/08 210/670 |
| 2015/0376015 A1 | 12/2015 | Yanagi et al. | |

FOREIGN PATENT DOCUMENTS

| | | |
|---|---|---|
| EP | 29360207 | 12/2015 |
| GB | 445342 | 4/1936 |
| JP | S60-050724 A | 11/1985 |
| JP | 0316908 | 1/1991 |
| JP | 07138010 | 5/1995 |
| JP | 09187648 | 7/1997 |
| JP | 2004149399 | 5/2004 |
| JP | 2005048798 | 2/2005 |
| JP | 2005319350 | 11/2005 |
| JP | 2009298668 | 12/2009 |
| JP | 2010269994 | 12/2010 |
| JP | 2010269994 A * | 12/2010 |
| JP | 2011057457 | 3/2011 |
| WO | 2010103323 | 9/2010 |
| WO | 2012172292 | 12/2012 |

OTHER PUBLICATIONS

English machine translation of JPH09-187648.*
English machine translation of WO2009154290.*
Machine English translation of JP 2010269994 A.*
European Search Report based on co-pending European Application No. 14753501.7, dated Sep. 26, 2016, 9 Pages.
Chinese Office Action based on co-pending Chinese Application No. 201480009363.X, dated Sep. 7, 2016, 6 Pages.
"Raw Materials of Activated Carbon", Nov. 1, 2016, retrieved from http://www.desotec.com/activated-carbon/how-is-it-made/raw-materials, 2 Pages.
"Impact of Raw Material on the Pore Structure of Activated Carbon", Nov. 1, 2016, retrieved from http://www.desotec.com/activated-carbon/how-is-it-made/raw-materials/pore-structure, 2 Pages.
"Impact of the Raw Material on the Purity of Activated Carbon", Nov. 1, 2016, retrieved from http://www.desotec.com/activated-carbon/how-is-it-made/raw-materials/purity, 2 Pages.
European Search Report based on co-pending European Application No. 14754777.2, dated Oct. 6, 2016—10 Pages.
International Search Report dated May 27, 2014 in co-pending PCT International Application No. PCT/JP2014/053554, filed Feb. 14, 2014.
International Search Report dated May 27, 2014 in co-pending PCT International Application No. PCT/JP2014/053551, filed Feb. 14, 2014.

* cited by examiner

GRANULAR ACTIVATED CARBON HAVING MANY MESOPORES, AND MANUFACTURING METHOD FOR SAME

CROSS-REFERENCE TO RELATED APPLICATIONS

This application is a national stage application filed under 35 USC 371 of PCT/JP2014/053554, filed Feb. 14, 2014, which claims the benefit of Japanese Patent Application No. 2013-031210, filed Feb. 20, 2013, all of which are incorporated herein, in entirety, by reference.

TECHNICAL FIELD

The present, invention relates to a novel granular activated carbon and a method for manufacturing the same.

BACKGROUND ART

Activated carbons are used in the treatment of water or aqueous solutions as adsorbents to remove impurities or adjust the concentration of dissolved components.

Among such activated carbons, zinc chloride-activated carbons having many mesospores are commonly used, in particular, to remove the coloring of the liquid phase of an aqueous solution, etc.

Although zinc chloride-activated carbons can effectively remove coloring components, wood powder is used as their raw material, and they are generally provided as powdered activated carbons; thus, these activated carbons are not suitable for column treatment or heat regeneration of used activated carbons. Further, granular products can be obtained by sieving; however, the granular products have a low hardness, causing problems in that they are difficult to handle during transport and loading, and in that powdering and fine granulation occur during use.

Moreover, as for chemical-activated carbons, the firing temperature during the manufacture thereof is low; therefore, many surface oxides are present on the surface of the activated carbons, which problematically reduces the adsorption of trace organics in solutions, and low-molecular-weight molecules, such as iodine.

In order to solve the above problems of zinc chloride-activated carbons, PTL 1 discloses a method for producing a chemical agent-activated molded active carbon, wherein a mixture of an active carbon raw material capable of being activated by a chemical agent and an activating chemical agent (e.g., zinc chloride) having a water content of 25 wt. % or less and an active component content of 60 wt. % or more is heated by a general method to form a reaction product, and the reaction product is molded, baked, washed, and dried to obtain a molded active carbon.

Furthermore, as a method for manufacturing an activated carbon having many mesopores, PTL 2 discloses an activated carbon for highly treating clean water obtained by mixing 100 parts by weight of carbonaceous raw material with 0.2 to 1.5 parts by weight (in terms of calcium) of at least one calcium compound, and carbonizing and activating the mixture; and also discloses a method for manufacturing the same.

CITATION LIST

Patent Literature

PTL 1: JPH07-138010A
PTL 2: JPH03-16908A

SUMMARY OF INVENTION

Technical Problem

However, the manufacturing process of PTL 1 is complicated. There has been a demand for the development of granular activated carbons having high decolorization performance manufactured by a simpler method. Further, the activated, carbon obtained in PTL 2 did not have the required hardness of granular activated carbons, and only had low hardness.

An object of the present invention is to provide a granular activated carbon having high adsorption performance suitable for the removal of coloring components, and a method for manufacturing the same.

Solution to Problem

In view of the above object, the present inventors conducted studies on the manufacture of granular activated carbons having many mesopores and halving a low impurity content. As a result, they found that granular activated carbons suitable for decolorization and purification of various liquids can be obtained by bringing an activated carbon that was previously activated into contact with a calcium component, followed by further activation, and washing. The present invention has been completed based on this finding.

That is, the present invention relates to the activated carbon and the method for manufacturing the same shown in the following items 1 to 5.

Item 1. A granular activated carbon having the following properties (1) to (3):

(1) an ignition residue of 2 mass fraction % or less;

(2) a hardness of 60 mass fraction % or more; and (3) a mesopore volume of 0.5 mL/g or more.

Item 2. A method for manufacturing a granular activated carbon, comprising the following steps (A) to (C) of:

(A) bringing an activated carbon into contact with a calcium component;

(B) activating the activated carbon obtained in step (A); and (C) washing the activated carbon obtained in step (B).

Item 3. A method for manufacturing a granular activated carbon, comprising the following steps (A) to (D) of:

(A) carbonizing an activated carbon raw material, followed by pulverization;

(B) mixing the activated carbon obtained in step (A) with a calcium component, followed by molding;

(C) carbonizing and activating the activated carbon obtained in step (B); and (D) washing the activated carbon obtained in step (C).

Item 4. The manufacturing method according to Item 2 or 3, wherein the activated carbon raw material is a coconut shell.

Item 5. A granular activated carbon obtained by the manufacturing method according to any one of Items 2 to 4.

The present invention is described in detail below. The present invention includes an invention of a granular activated carbon, an invention of a method for manufacturing the granular activated carbon, and an invention of the use of the granular activated carbon for liquid treatment (more specifically, for liquid purification and for adsorption treatment, of a liquid for decolorization, etc.).

Activated Carbon of the Present Invention

The activated carbon of the present invention is a granular activated carbon having the following properties (1) to (3):
(1) an ignition residue of 2 mass fraction % or less;
(2) a hardness of 60 mass fraction % or more; and
(3) a mesopore volume of 0.5 mL/g or more.

The following describes properties (1), (2), and (3) in this order.

Property (1)

The ignition residue of the activated carbon of the present invention is 2 mass fraction % or less, and preferably 1.5 mass fraction % or less. The ignition residue is generally measured by JIS K1474 (JIS: Japanese Industrial Standard). Specifically, the activated carbon (sample) of the present invention is subjected to ignition incineration in an electric furnace, and the residue is determined. When the ignition residue is 2 mass fraction % or less, the impurity content is low. Therefore, the activated carbon of the present invention can be suitably used as an activated carbon for liquid phase treatment, without polluting the treatment liquid.

The specific steps (i) to (iv) for measuring ignition residue specified in JIS K1474 are described below.

(i) The sample (1 to 5 g) is weighed to a precision of 1 mg in a porcelain crucible that has been previously adjusted to a constant weight. The sample has been previously dried in a constant-temperature oven at 115±5° C. for 3 hours, and then cooled to room temperature in a desiccator (using silica gel as a desiccant).

(ii) After step (i), the sample is placed in an electric furnace. First, the sample is gently heated, and then the temperature is gradually increased to completely ash the sample, followed by ignition at 800 to 900° C. for 1 hour.

(iii) After ignition of the sample in step (ii), the sample is cooled in a desiccator (using silica gel as a desiccant), and the mass is weighed to a precision of 1 mg, and the residue is determined.

(iv) The ignition residue is calculated by the following formula (2):

$$A=(R/S)\times 100 \quad (2)$$

wherein A is the ignition residue (mass fraction %), R is the residue (g), S is the mass (g) of the sample, and "/" means division.

[1] The porcelain crucible is the 30-mL porcelain crucible of type A, B, or C specified in JIS R1301.

[2] The constant-temperature oven can be adjusted to a temperature range of 115±5° C.

[3] The electric furnace can be adjusted to a temperature range of 800 to 900° C.

The ignition residue of the activated carbon of the present invention can be adjusted to 2 mass fraction % or less by, for example, suitably setting the washing time, washing frequency, acid concentration, etc., in step (C) of method 1 for manufacturing the activated carbon of the present invention, or in step (D) of method 2 for manufacturing the activated carbon of the present invention, described later.

Property (2)

The hardness of the activated carbon of the present invention is 60 mass fraction % or more, and preferably 70 mass fraction % or more. The hardness is generally measured by JIS K1474. Specifically, the activated carbon (sample) of the present invention is placed, in a hardness test plate, together with steel balls, and the plate is shaken, followed by sieving. The mass of the sample remaining on the sieve is determined, and the hardness is determined by comparing the determined mass with the original mass of the sample. When the hardness is 60 mass fraction % or more, the generation of fine powder can be prevented when the activated carbon of the present invention is used as a granular carbon. The upper limit of the hardness is not particularly limited, but is generally 100 mass fraction %.

The specific steps (i) to (vii) for measuring the hardness specified in JIS K1474 are described below.

(i) The sample is sieved for 10 minutes using two sieves with openings that correspond to the upper and lower limits of the particle size range, by specific steps (i) to (v) for measuring the particle size, described below.

(ii) The sieved sample is placed in a 200-mL measuring cylinder up to the reference line (100 mL) while slightly tapping the cylinder. The mass of the sample is weighed to a precision of 0.1 g.

(iii) The sample is placed in a hardness test plate, together with 15 steel balls having a diameter of 12.7 mm, and 15 steel balls having a diameter of 9.5 mm.

(iv) The hardness test plate containing the sample is attached to a sieve shaker and shaken for 30 minutes.

(v) The steel balls are removed, and the entire sample is placed in a saucer and a sieve with an opening smaller by 2 degrees than the opening corresponding to the lower limit, of the particle size range, and the saucer and sieve are attached to the sieve shaker.

(vi) After shaking for 3 minutes, the mass of each sample remaining on the sieve and saucer is weighed, to a precision of 0.1 g. When the total mass of the samples increases and decreases by 2% or more from the initially weighed mass, a retest is performed.

(vii) The hardness is determined by the following formula (3):

$$H=(W/S)\times 100 \quad (3)$$

wherein H is the hardness (mass fraction %), W is the mass (g) of the sample remaining on the sieve in step (vi), S is the total mass (g) of the samples remaining on the sieve and saucer, and "/" means division.

[1] The sieve is the mesh sieve specified in JIS Z8801-1. The size of the sieve frame is such that the inner diameter of the portion above the sieve surface is 200 mm.

Figure 1:
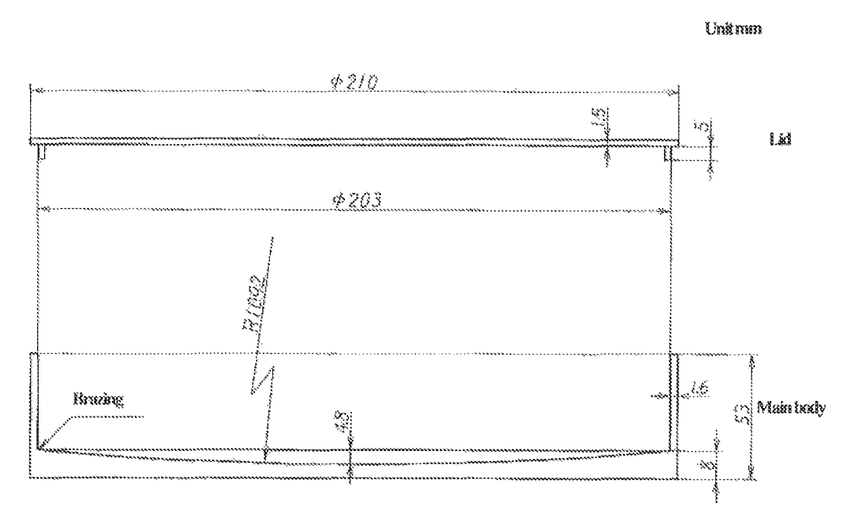
FIG. 1 shows an example of the hardness test plate used for the hardness measurement specified in JIS K1474.

[2] The hardness test plate is made of the material specified in JIS H3100, i.e., C2680P or C2720P (brass plate). FIG. 1 shows an example of the plate.

[3] The sieve shaker is a Tyler sieve shaker or a similar sieve shaker. The number of strokes per minute is 130 to 165, and the number of rotations per minute is 240 to 295.

[4] The steel balls are 15 steel balls having a diameter of 12.7±0.1 mm, and 15 steel balls having a diameter of 9.5±0.1 mm.

[5] The measuring cylinder is the 200-mL measuring cylinder specified in JIS R3505.

The hardness of the activated carbon of the present invention can be adjusted to 60 mass fraction % or more by, for example, suitably setting the type of activated carbon raw material in step (A) of method 1 or 2 for manufacturing the activated carbon of the present invention, described later, and the amount and type of binding component in step (B) of manufacturing method 2.

Property (3)

The activated carbon of the present invention has a mesopore volume of 0.5 mL/g or more, preferably 0.55 mL/g or more, and more preferably 0.7 mL/g or more. The "mesopore volume" mentioned herein refers to the volume of pores with a diameter of 2 to 30 nm measured by a nitrogen adsorption method and calculated by the Cranston-Inkley method. The pores are involved in the adsorption performance of a coloring substance. An activated carbon having too many mesopores has a lower hardness; therefore, the upper limit of the mesopore volume is about 1.5 mL/g.

The mesopore volume of the activated carbon of the present invention can be adjusted to 0.5 mL/g or more by, for example, suitably setting the activation conditions (e.g., activation temperature and partial steam pressure) in step (B) of method 1 for manufacturing the activated carbon of the present invention, and step (C) of manufacturing method 2, described later.

The "granular activated carbon" refers to one in which the particle size specified in JIS K1474 is 0.150 mm or more. The fact that the particle size specified in JIS K1474 is 0.150 mm or more has the same meaning as the fact that the particle size measured according to JIS K1474, described later, is 0.150 mm or more. Activated carbons in which the particle size specified in JIS K1474 is less than 0.150 mm are powdered activated carbons, which are not included in the present invention.

In the activated carbon of the present invention, the particle size measured according to JIS K1474 is preferably 0.150 to 8.00 mm, more preferably about 0.300 to 4.70 mm, and particularly preferably about 0.500 to 2.36 mm.

The specific steps (i) to (v) for measuring the particle size specified in JIS K1474 are described below.

(i) The activated carbon (sample) of the present invention is dried in a constant-temperature oven at 115±5° C. for 3 hours, and then cooled to room temperature in a desiccator (using silica gel as a desiccant). Then, about 100 g of sample is weighed to a precision of 0.1 g.

(ii) Six or seven sieves with openings gradually larger from an opening smaller by one level than the opening corresponding to the lower limit of the particle size range of the sample to an opening larger by one level than the opening corresponding to the upper limit are sequentially laminated on a saucer in the ascending order of openings. When the particle size range of the sample is narrow, the number of sieves is reduced, as appropriate. When the particle size range is wide, the number of sieves is increased, as appropriate.

(iii) After the sample is placed in the topmost sieve, the sieve is covered with a lid, and attached to a sieve shaker, followed by sieving for 10 minutes.

(iv) The mass of each sample remaining on each sieve and saucer is weighed to a precision of 0.1 g. When the total mass of the samples remaining on each sieve and saucer increases and decreases by 2% or more from the initially weighed mass, a retest is performed.

(v) The particle size is calculated by the following formula (4):

$$G_i = (W_i/S) \times 100 \qquad (4)$$

wherein $G_i$ is the particle size (mass fraction %), $W_i$ is the mass (g) of the samples remaining on each sieve and saucer, S is the total mass (g) of the samples remaining on each sieve and saucer, and "/" means division. The particle size $G_i$ indicates the particle size in the range from the opening of a sieve (No. i) to the opening of another sieve (No. i+1) larger by one level than sieve No. i, and indicates the mass fraction % in the specific particle size range with respect to the total mass of the samples. For example, in the present specification, the fact that the particle size measured according to JIS K1474 is 0.150 mm or more indicates that 95 mass fraction % or more of sample has a particle size range of 0.150 mm or more.

[1] The constant-temperature oven can be adjusted to a temperature range of 115±5° C.

[2] The sieve and sieve shaker are the same as those used, to measure the hardness mentioned above.

The specific surface area of the activated carbon of the present, invention is not particularly limited. For example, the specific surface area is generally 700 to 2,500 m²/g, and preferably 1,000 to 2,200 m²/g.

Manufacturing Method 1

The method for manufacturing the activated carbon of the present invention (manufacturing method 1) comprises the following steps (A) to (C):

(A) bringing an activated carbon into contact with a calcium component;

(B) activating the activated carbon obtained in step (A); and (C) washing the activated, carbon obtained in step (B).

The activated carbon manufacturing method of the present invention comprising steps (A) to (C) above can suitably produce a granular activated carbon having the following properties (1) to (3):

(1) an ignition residue of 2 mass fraction % or less;

(2) a hardness of 60 mass fraction % or more; and (3) a mesopore volume of 0.5 mL/g or more.

In particular, in the above manufacturing method, a raw material activated carbon that has been subjected to general carbonization and activation is brought into contact with a calcium component, followed by further activation, and washing.

The following describes steps (A), (B), and (C) of manufacturing method 1 in this order.

Step (A): Contact Between Activated Carbon and Calcium Component

Activated Carbon

In the present invention, the activated carbon used in step (A) is a granular activated carbon that has been previously activated. The particle size of the activated carbon is not particularly limited. For example, the particle size is 0.150 to 11.2 mm, preferably 0.500 to 5.60 mm, and more preferably 1.00 to 2.80 mm. When the particle size is overly small, the activated carbon may be scattered from the reactor due to the airflow in the subsequent activation process.

Moreover, the specific surface area of the activated carbon is 800 to 2,000 m²/g, preferably 1,000 to 1,800 m²/g, and more preferably 1,200 to 1,700 m²/g. When the specific surface area is within this range, the calcium compound can be sufficiently dispersed and attached to the activated carbon surface and the pores. Further, by selecting the specific surface area of the activated carbon, the micropore volume of the obtained activated carbon having many mesopores can be adjusted.

The method for manufacturing the granular activated carbon used in step (A) is not particularly limited. The granular activated carbon may be a crushed activated carbon obtained by carbonizing and activating an activated carbon raw material, or may be a granulated activated carbon obtained by carbonizing an activated carbon raw material, followed by pulverization and molding, and further followed by carbonization and activation.

The raw material of the granular activated carbon is not particularly limited, as long as it is a generally used activated carbon raw material and has a low impurity content. Examples thereof include coconut shells (e.g., palm coconut shell and coconut shell), natural fibers (e.g., hemp and cotton), synthetic fibers (e.g., rayon and polyester), synthetic resins (e.g., polyacrylonitrile, phenol resin, polyvinylidene chloride, polycarbonate, and polyvinyl alcohol), and the like. Preferred among these are coconut shells.

The raw material of the granular activated carbon is carbonized at 600° C. to 800° C., for example. The carbonization time can be suitably set depending on the raw material used and the device to perform carbonization, and is generally about 0.5 to 10 hours, preferably about 0.5 to 5 hours, and more preferably about 0.5 to 2 hours. The carbonization treatment is performed by using a known manufacturing device, such as a rotary kiln.

The obtained carbonized product is activated by suitably using, for example, the activation method described in "Activated Carbon Industry," published by The Heavy & Chemical Industries News Agency (1974) pp. 23-37 (e.g., activation method using activating gas, such as steam, oxygen, or carbon dioxide gas). Among them, steam activation is preferred in terms of obtaining an activated carbon having a hardness suitable for use. The activation treatment is performed in a temperature range of about 750 to 1,050° C. using a known manufacturing device, such as a rotary kiln or a fluidized bed furnace.

The activation time varies depending on the raw material used, activation temperature, manufacturing device, etc., and cannot be generalized; however, the activation time is generally about 0.5 to 48 hours, and preferably 1 to 24 hours.

Thereafter, the activated carbon after activation is sieved to regulate the particle size, thereby obtaining a granular activated carbon. The particle size is as described, in "Property (3)" in "Activated Carbon of the Present Invention" above.

Although, the activated, carbon after activation may be washed, it is preferable that the activated carbon after activation is brought into contact with a calcium component without washing.

Contact with Calcium Component

The granular activated carbon that has been previously activated is brought into contact with a calcium component. This contact process attaches the calcium component to the activated granular activated carbon surface and pores.

Calcium components are not particularly limited. For example, (1) water-soluble calcium compounds, (2) water-insoluble calcium compounds, etc., can be used. Calcium components can be used singly or in a combination of two or more.

Examples of water-soluble calcium compounds include calcium chloride, calcium nitrate, calcium acetate, and the like. Among these, calcium chloride is preferably used because cracked gas is not generated during heating.

Examples of water-insoluble calcium compounds include calcium carbonate, calcium hydroxide, and the like. Among these, calcium carbonate is preferably used, in terms of handling safety.

The content of the calcium component, which is attached to the activated granular activated carbon surface and pores by the contact process, in the activated carbon is, as calcium (in terms of calcium), 0.5 to 2 wt. %, preferably 0.8 to 2 wt. %, and more preferably 1 to 1.8 wt. %. The calcium content is calculated as the mass fraction % of calcium in the activated granular activated carbon after calcium is attached, according to the method for measuring iron prescribed in JIS K1474. Moreover, in order to improve dispensability, if is preferable to add a calcium component in the form of an aqueous solution.

Any method may be used to bring the activated granular activated carbon into contact with a calcium component, as long as the calcium component can be introduced into the activated carbon. Examples thereof include a method in which a calcium component aqueous solution is sprayed while mixing the activated carbon, a method in which the activated carbon is impregnated in a calcium component aqueous solution, a method in which the activated carbon is simply mixed with a powdery calcium component, and the like.

When a calcium component aqueous solution is used in the calcium component-contacting method, the activated carbon after contact with the calcium component is dried by a general method and then subjected to activation; however, the activated carbon after contact with the calcium component may be directly subjected to activation after draining.

Step (B): Activation

The activated carbon after contact with a calcium component is then subjected to activation.

The activation treatment is performed by suitably using, for example, the activation method described in "Activated Carbon Industry," published by The Heavy & Chemical Industries News Agency (1974) pp. 23-37 (e.g., activation method using activating gas, such as steam, oxygen, or carbon dioxide gas). Among them, steam activation is preferred in terms of obtaining an activated carbon having a hardness suitable for use. The activation treatment is performed using a known manufacturing device, such as a rotary kiln or a fluidized bed furnace.

The activation temperature varies depending on the raw material used, manufacturing device, etc., and cannot be generalized; however, the activation temperature is generally 800 to 1,000° C., and preferably 850 to 950° C. The steam, partial pressure may be in the range of 10 to 100%, and is preferably in the range of 30 to 100%.

Moreover, when the activation yield is set to 20 to 50%, a product having the desired performance can be obtained. When the activation yield, is overly low, the hardness is reduced, and impurities are concentrated. Consequently, it becomes difficult to remove the impurities in the washing step. The activation yield is based on the previously activated granular activated carbon used in step (A).

The activation time varies depending on the raw material used, activation temperature, manufacturing device, etc., and cannot be generalized; however, the activation time can be suitably determined within a range that satisfies the above activation yield.

Thereafter, the activated carbon after activation is sieved to regulate the particle size. The particle size is as described in "Property (3)" in "Activated Carbon, of the Present Invention" above.

Step (C): Washing of Activated Carbon after Activation

The obtained activated carbon is washed by a known method, using a mineral acid, such as hydrochloric acid or nitric acid. Mineral acid washing is performed, for example, by bringing the activated carbon into contact with hydrochloric acid. The activated carbon can be brought into contact with hydrochloric acid by, for example, immersing the activated carbon in a suitable amount of hydrochloric acid with a suitable concentration, or by flowing the hydrochloric acid on the activated carbon.

The concentration of the mineral acid (e.g., hydrochloric acid) may be determined so that alkaline components contained in the activated carbon can be neutralized, and so that metal salts (ash content) contained as impurities can be dissolved. For example, the concentration of hydrogen chloride is 0.1 to 15 mass fraction %, and preferably 0.5 to 5 mass fraction %.

The activated carbon to be washed with a mineral acid may be in a state of the activated carbon after activation, or the activated carbon after activation may be previously washed with water to remove water-soluble inorganic components.

Mineral acid washing is continued until the pH of the activated carbon becomes neutral. The washing method may be a batch or continuous process. The washing time is not particularly limited, but is preferably about 0.5 to 10 hours. The washing temperature is generally 5 to 80° C., and preferably 10 to 80° C. High-temperature washing can reduce the washing time.

Washing by a mineral acid mentioned above may be followed by further washing with water. Components eluted from the activated carbon by mineral acid washing can be sufficiently removed by this water-washing process. The water-washing method may be a batch or continuous process. The washing time is not particularly limited, but is preferably about 1 to 20 hours. The washing temperature is generally 5 to 80° C., and preferably 10 to 80° C. High-temperature washing can reduce the washing time.

In order to prevent adverse effects resulting from the elution of the impurities, the ignition residue of the activated carbon after mineral acid washing, or after mineral acid washing, followed by further water washing, is 2 mass fraction % or less, and preferably 1.5 mass fraction % or less.

After washing, the obtained activated carbon is dried. The drying means is not particularly limited, and a known drying means can be used. For example, the activated carbon is heated at about 50 to 200° C., and preferably about 80 to 150° C., using a device, such as a constant-temperature oven, fluidized dryer, vibrating fluidized dryer, or rotary kiln. The drying loss of the activated, carbon after drying is preferably 5 mass fraction % or less, and more preferably 3 mass fraction % or less.

The dried activated carbon can be further pulverized before use. The particle size after pulverization is not particularly limited. For example, the particle size is 0.500 to 2.36 mm, 0.500 to 1.70 mm, 0.300 to 0.850 mm, 0.250 to 0.500 mm, 0.180 to 0.355 mm, or the like that is used as general granular activated carbon. The particle size is preferably about 0.150 to 8.00 mm, more preferably about 0.300 to 4.70 mm, and particular preferably about 0.500 to 2.36 mm.

Manufacturing Method 2

The method for manufacturing the activated carbon of the present invention (manufacturing method 2) comprises the following steps (A) to (D):

(A) carbonizing an activated carbon raw material, followed by pulverization;

(B) mixing the activated carbon obtained in step (A) with a calcium component, followed by molding;

(C) carbonizing and activating the activated carbon obtained in step (B); and (D) washing the activated carbon obtained in step (C).

The activated carbon manufacturing method, of the present invention comprising steps (A) to (D) above can suitably produce a granular activated carbon having the following properties (1) to (3):

(1) an ignition residue of 2 mass fraction % or less;

(2) a hardness of 60 mass fraction % or more; and (3) a mesopore volume of 0.5 mL/g or more.

In particular, in the above manufacturing method, an activated carbon is mixed with a calcium component, followed by molding, and the resulting molded product is carbonized and activated, followed by washing.

The following describes steps (A), (B), (C), and (D) of manufacturing method 2 in this order.

Step (A): Carbonization and Pulverization of Activated Carbon Raw Material

Activated Carbon

The raw material of the activated carbon of the present invention is not particularly limited, as long as it is a generally used activated carbon raw material and has a low impurity content. Examples thereof include the same raw materials specifically mentioned, above as the raw material of the granular activated carbon in step (A) of manufacturing method 1. Coconut shells are preferably used as the raw material of the activated carbon.

Although the carbonization conditions of the activated carbon raw material are not particularly limited, the activated carbon raw material can be generally carbonized by heating to 300 to 900° C., and more preferably 300 to 600° C., under oxygen-free conditions.

The carbonization time can be suitably set depending on the raw material used and the device to perform carbonization, and is about 30 minutes to 20 hours, and preferably about 1 hour to 10 hours. The carbonization treatment is performed by using a known manufacturing device, such as a rotary kiln.

The volatile component of the carbonized product is 5 to 40 mass fraction %, preferably 10 to 30 mass fraction %, and more preferably 10 to 20 mass fraction %.

Subsequently, the carbonized product obtained by carbonizing the activated carbon raw material is pulverized. The pulverization conditions are not particularly limited, and the carbonized product can be pulverized using a generally used pulverization device. The average particle diameter (median diameter) of the pulverized product is generally 2 to 100 μm, and preferably 10 to 70 μm.

Step (B): Mixing with Calcium Component, and Molding

The pulverized product obtained by pulverization is mixed with a calcium component, and the mixture is then molded.

Calcium components are not particularly limited. Examples thereof include the same calcium components specifically mentioned above in step (B) of manufacturing method 1. Calcium chloride is preferably used as the water-soluble calcium compound, and calcium carbonate is preferably used as the water-insoluble calcium compound.

Although the amount of the calcium component is not particularly limited, the amount as calcium (in terms of calcium) is 0.5 to 1.5 parts by weight, and preferably 0.6 to 1.2 parts by weight, based on 100 parts by weight of the pulverized product after carbonization (the activated carbon obtained in step (A)). Moreover, in order to improve dispersibility, it is preferable to add a calcium component-containing aqueous solution to the pulverized product after carbonization; however, it may be sufficient to simply mix a powdery calcium component and the pulverized product after carbonization.

When the pulverized product after carbonization is brought into contact with a calcium component, it is preferable to further mix a binding component, etc., so as to facilitate subsequent molding. Binding components are not particularly limited, and may be those generally used for the manufacture of activated carbons. Examples thereof include pulp waste water, phenol resin, melamine resin, petroleum pitch (e.g., hard pitch), coal tar, and the like. These binding components can be used singly or in a combination of two or more. Preferred are petroleum pitch.

The amount of the binding component is suitably set depending on the molded state of the molded product. For example, about 40 to 45 parts by weight of binding component is used based on 100 parts by weight of the pulverized product after carbonization.

Further, in order to facilitate mixing between the pulverized, product after carbonization and a calcium component, a binding auxiliary component, a primary binder, etc., can be mixed together with the binding component.

Binding auxiliary components are not particularly limited, as long as they can soften or dissolve the binding component to facilitate mixing. Examples thereof include heavy oil, creosote oil, high-boiling-point liquid organic compounds (castor oil, lubricating oil, etc.), and the like. These binding auxiliary components can be used singly or in a combination of two or more. Preferred are creosote oil, etc.

The amount of the binding auxiliary component is suitably set depending on the type and amount of the binding component. For example, about 5 to 10 parts by weight of binding auxiliary component is used based on 25 parts by weight of binding component.

Primary binders are not particularly limited, as long as they can temporarily fix the pulverized product before the binding component exhibits its effect. Examples thereof include lignin, hydroxymethylcellulose, glue, and the like. These primary binders can be used singly or in a combination of two or more. Preferred are lignin, etc.

The amount of the primary binder is suitably set depending on the type and amount of the binding component. For example, about 1 to 2 parts by weight of the primary binder is used based on 25 parts by weight of binding component.

When the pulverized product after carbonization is brought into contact with a calcium component, water can also be mixed so as to adjust the hardness of the obtained molded, product. The amount of water is suitably set depending on the molded state of the molded product. For example, about 10 to 15 parts by weight of water is used based on 100 parts by weight of the pulverized product after carbonization.

The conditions of mixing the pulverized product after carbonization, a calcium component, and a binding component are not particularly limited, and they can be mixed by a known method. For example, mixing can be performed by using a mixer, such as a paddle-type mixer, a batch-type kneader, or a continuous-type kneader.

As the mixing order, for example, the pulverized product after carbonization and a binding component are supplied to a kneader and mixed, and then a calcium component ((1) a water-soluble calcium compound, (2) a water-insoluble calcium compound, (3) an aqueous solution of a water-soluble calcium compound, or the like) is supplied and mixed. Alternatively, a binding component and a calcium component mentioned above are previously mixed, and they are simultaneously supplied, to the pulverized product after carbonization. The mixing time is not particularly limited, as long as the above components can be sufficiently mixed. The mixing time is generally about 10 to 60 minutes.

The method for molding the mixture obtained by the above mixing process is not particularly limited, and a known molding method can be used. Examples of the method include extrusion molding, spherical molding by tumbling granulation, compression molding using a tableting machine, rolling using a roll, and the like. Preferred is extrusion molding. The particle size of the molded product can be determined so as to be suitable for the subsequent carbonization and activation treatments. For example, the particle size of the molded product is 0.2 to 11 mm, preferably 0.5 to 4 mm, and more preferably 1 to 2.8 mm.

Step (C): Carbonization and Activation of Molded Product

Although the carbonization conditions of the molded product are not particularly limited, a carbonized product can be obtained by, for example, heating to 500 to 900° C., and more preferably 500 to 800° C., in an oxygen-free inert atmosphere.

The carbonization time can be suitably set depending on the raw material used and the carbonization device, and is generally about 1 to 10 hours, and preferably about 2 to 8 hours. The carbonization treatment is performed by using a known manufacturing device, such as a rotary kiln.

The carbonized product obtained by carbonizing the molded product is subjected to activation. Examples of the activation treatment include the same activation methods specifically mentioned above in step (B) of manufacturing method 1. Preferred among them is steam activation. The manufacturing device, activation temperature, and partial, steam pressure in the activation treatment are also the same as those described above in step (B) of manufacturing method 1. For example, the activation temperature is generally 800 to 1,000° C., and preferably 850 to 950° C. The steam partial pressure may be in the range of 10 to 100%, and is preferably in the range of 30 to 100%.

Moreover, when the activation yield is set to 10 to 25% (preferably 15 to 20%) based on the product after carbonization in step (C), a product having the desired performance can be obtained. When the activation yield is overly low, the hardness is reduced, and impurities are concentrated. Consequently, it becomes difficult to remove the impurities in the washing step.

The activation time varies depending on the raw material used, activation temperature, manufacturing device, etc., and cannot be generalized; however, the activation time can be suitably determined within a range that satisfies the above activation yield.

The number of times of activation in step (C) is one or more. That is, activation may be performed twice or more in step (C). When activation is performed twice or more, the conditions (e.g., activation time and activation temperature) of each activation treatment may be suitably set so that the final activation yield (after activation) is 10 to 25%, as mentioned above. It is preferable to perform activation twice in step (C).

For example, when the number of times of activation in step (C) is two, it is preferable to suitably set the conditions (e.g., activation time and activation temperature) of the first activation treatment so that the activation yield is within the range of 40 to 55%, and to suitably set these conditions of the second activation treatment so that the activation yield is within the range of 30 to 45%. Thereby, as is clear from the fact that the final activation yield is calculated by multiplying the first activation yield by the second activation yield, the final activation yield can suitably be set within the range of 10 to 25% based on the product after carbonization, as described above.

Thereafter, the activated carbon after activation is sieved to regulate the particle size. The particle size is as described in "Property (3)" in "Activated Carbon of the Present Invention" above.

Step (D): Washing

The obtained activated carbon is washed by a known method. Examples of the washing method include the same washing methods (e.g., mineral acid washing) mentioned above in step (C) of manufacturing method 1. The contact method in mineral acid washing, the concentration of the mineral acid, the state of the activated carbon subjected to mineral acid washing, washing method, washing time, washing temperature, the water-washing method after mineral acid washing, the time and temperature of the water-washing method, the ignition residue of the activated carbon after mineral acid washing, the drying means after washing, the drying temperature, the drying loss of the activated carbon after drying, and the like are also the same as those described above in step (C) of manufacturing method 1. (Preferred embodiments and more preferred embodiments are also the same as those described above in step (C) of manufacturing method 1.)

The dried activated carbon can be further pulverized before use. The particle size after pulverization is not particularly limited. Examples thereof include the same particle sizes after pulverization specifically mentioned above in step (C) of manufacturing method 1. The particle size after pulverization is preferably about 0.150 to 8.00 mm, more preferably about 0.300 to 4.70 mm, and particularly preferably about 0.500 to 2.36 mm.

Advantageous Effects of Invention

The activated carbon of the present invention has many mesopores and a low impurity content, as with zinc chloride-activated carbons. Moreover, the activated carbon of the present invention is a granular activated carbon having a high hardness, which is different from zinc chloride-activated carbons. Therefore, the activated carbon of the present invention can be suitably used for liquid treatment applications, particularly in a purification process of the food and pharmaceutical industries.

Furthermore, clue to the excellent ability of removing coloring components, the activated carbon of the present invention is suitable for the decolorization and purification of various liquids.

DESCRIPTION OF EMBODIMENTS

The present invention is described in detail below with reference to Examples and Comparative Examples; however, the present invention is not limited thereto.

EXAMPLES

Example 1

Coconut shells (produced on Mindanao Island of the Republic of the Philippines) were carbonized at a reaching temperature of 650° C. for 8 hours, and then activated by steam at 900° C., thereby obtaining a coconut shell-activated carbon (specific surface area: 1,282 m²/g). To 500 g of the coconut shell-activated carbon, a calcium chloride aqueous solution (10 g of calcium chloride and 350 g of water) was sprayed so that the amount of calcium chloride was 2 wt. %. Thereafter, the resulting product was dried in an electric dryer adjusted to 115±5° C. The calcium content of the activated carbon, was 0.8 wt. %.

The dried calcium-contact activated carbon (200 g) was activated by steam under the conditions shown in Table 1. After cooling, the obtained activated product was washed by boiling in a hydrochloric acid aqueous solution (concentration: 3 wt. %) for 10 minutes, and then boiled in water for 10 minutes three times. After draining, the resulting product was dried in an electric dryer adjusted to 115±5° C., and pulverized by using a roll mill to a particle size of 0.6 to 0.212 mm, followed by particle size regulation, thereby obtaining an activated carbon.

Example 2

An activated carbon was obtained in the same manner as in Example 1, except that 15 g of calcium chloride and 350 g of water were used as the calcium chloride aqueous solution, the calcium content of the activated carbon was changed to 1.1 wt. %, and the activation time was changed as shown in Table 1.

Comparative Example 1 and 2

Coconut shells (produced, on Mindanao Island of the Republic of the Philippines) were carbonized at 550° C. for 8 hours, and then pulverized to an average particle diameter of 20 to 80 µm. The pulverized product (1,000 g), a calcium aqueous solution prepared by dissolving 25 g of calcium chloride (special grade chemical; produced by Wako Pure Chemical Industries, Ltd.) in 57 g of water, 250 g of hard pitch having a softening point of 110° C., 80 g of creosote, 15 g of lignin (SAN X-M, produced by Nippon Paper Industries Co., Ltd.), and 73 g of water were placed in a kneader and mixed for 25 minutes. Then, the resulting mixture was extruded from an extrusion granulator (pore size: 4 mm). The extruded product was heated to 650° C. at a ratio of 5° C./min, and then maintained for 30 minutes, thereby obtaining a coconut shell-carbonized product. The carbonized product was activated by steam under the conditions shown in Table 1. The obtained activated, product was not washed. Thus, an activated carbon was obtained.

Example 3

Coconut shells (produced on Mindanao Island of the Republic of the Philippines) were carbonized at 550° C. for 8 hours, and then pulverized to an average particle diameter of 20 to 80 µm. The pulverized product (1,000 g), 27.5 g of calcium carbonate (special grade chemical; produced by Wako Pure Chemical Industries, Ltd.), 250 g of hard pitch having a softening point of 110° C., 80 g of creosote, 15 g of lignin (SAN X-M, produced by Nippon Paper Industries Co., Ltd.), and 130 g of water were placed in a kneader and mixed for 25 minutes. Then, the resulting mixture was extruded from an extrusion granulator (pore size: 4 mm), and carbonization and steam activation were performed. The carbonization conditions were as follows: carbonization reaching temperature: 650° C.; temperature increase rate: 5° C./min; and retention time: 30 minutes. The steam activation conditions were as follows: activation temperature: 900° C.; activation time: 135 minutes; and activation yield: 45.5%. Thereby, activated carbon A (specific surface area: 1.208 m²/g, pore volume: 0.585 mL/g, and mesopore ratio (mesopore volume/total pore volume)=0.42) was obtained. Subsequently, activated carbon A was activated by steam again for 150 minutes at an activation temperature of 900° C. until the activation yield reached 35%. The obtained, activated product (final activation yield: 15.9% (=45.5%×35%) based on the product after carbonization for a retention time of 30 minutes) was washed by boiling in a hydrochloric acid aqueous solution (concentration: 3 wt. %) for 10 minutes, and then boiled in water for 10 minutes three times. After draining, the resulting product was dried in an electric dryer adjusted to 115±5° C., and pulverized by using a roll mill to a particle size of 0.6 to 0.212 mm, followed by particle size regulation, thereby obtaining an activated carbon.

TABLE 1

|  | Ex. 1 | Ex. 2 | Comp. Ex. 1 | Comp. Ex. 2 |
|---|---|---|---|---|
| Activation temperature (° C.) | 900 | 900 | 900 | 900 |
| Activation time (min) | 165 | 180 | 180 | 210 |
| Activation yield (%) | 32.9 | 23.2 | 34.4 | 22.8 |

Performance Measurement of Activated Carbon

Nitrogen adsorption isotherms of the activated carbons obtained in Examples 1 to 3 and Comparative Examples 1 and 2 above, and an activated carbon obtained in Comparative Example 3 below, were measured at the boiling point temperature of liquid nitrogen. The specific surface area was determined by the BET method, and the pore distribution was determined by the CI method. Pores with a diameter of up to 2 nm were regarded as micropores, and pores with a diameter of 2 to 30 nm were regarded as mesopores. Further, the ignition residue, iodine adsorption performance, and hardness were measured according to JIS K1474.

Comparative Example 3

A commercially available zinc chloride-activated granular activated carbon (Granular Shirasagi KL, produced by Japan EnviroChemicals) was used.

Table 2 shows the performance measurement results.

TABLE 2

|  | Ex. 1 | Ex. 2 | Ex. 3 | Comp. Ex. 1 | Comp. Ex. 2 | Comp. Ex. 3 |
|---|---|---|---|---|---|---|
| Ignition residue (mass fraction %) | 0.3 | 0.2 | 1.6 | 1.6 | 2.2 | 0.6 |
| Hardness (mass fraction %) | 78 | 66 | 62 | 77 | 18 | 55 |
| Iodine adsorption performance (mg/g) | 1680 | 1810 | 1570 | 1280 | 1630 | 980 |
| Specific surface area (m²/g) | 2027 | 2058 | 1754 | 1362 | 1859 | 1413 |
| Pore volume (ml/g) | 1.233 | 1.62 | 1.166 | 0.828 | 1.159 | 1.182 |
| Mesopore volume (ml/g) | 0.63 | 1.11 | 0.71 | 0.45 | 0.72 | 0.96 |

Decolorization Performance Measurement of Activated Carbon

The activated carbons of Examples 1 to 3 and Comparative Example 3 were prepared, and each activated carbon was pulverized. The pulverization of each activated carbon was performed so that 30% or more of a suitable amount of sample was passed through the 45-μm mesh sieve specified in JIS Z 8801-1 (sieve frame size: inner diameter of the portion above the sieve surface: 75 mm). Subsequently, the pulverized activated carbons of Examples 1 to 3 and Comparative Example 3 were each added to 50 mL of commercially available thin soy sauce (registered trademark: Higashimaru, produced by Higashimaru Shoyu Co., Ltd.). Each of the resulting mixtures was shaken at 25° C. for 3 hours, followed by filtration, thereby obtaining a filtrate. Next, the absorbance of each filtrate was measured at a wavelength of 460 nm, and the absorbance adsorption amount per unit mass of the activated carbon when the filtrate was decolorized to 1/10 of the original absorbance (3.8) was calculated, and determined.

Table 3 shows the results.

TABLE 3

|  | Soy sauce absorbance adsorption amount (E · L/g) |
|---|---|
| Ex. 1 | 0.21 |
| Ex. 2 | 0.25 |
| Ex. 3 | 0.25 |
| Comp. Ex. 3 | 0.18 |

The mesopore volume of the activated carbons of the present invention was equivalent to that of the commercially available zinc chloride-activated granular activated carbon. Further, the decolonization performance of the activated carbons of the present invention was equal to or higher than that of the zinc chloride-activated carbon (Examples 1 to 3).

In contrast, the mesopore volume of the activated carbon of Comparative Example 1 was insufficient. Although the mesopore volume was increased by reducing the yield, the hardness was very low, making it unusable as a granular activated carbon (Comparative Example 2).

The activated carbons of the present invention had a higher hardness and much more excellent iodine adsorption performance than the zinc chloride-activated carbon (Examples 1 to 3 and Comparative Example 3). Therefore, the activated carbons of the present invention can be regarded as granular activated carbons having sufficient hardness, excellent handling properties, and high adsorption performance.

INDUSTRIAL APPLICABILITY

The activated carbon of the present invention can be used for liquid treatment applications, particularly applications in which decolorization performance is an issue, as a granular activated carbon in a column passing system, in contrast to conventional wood-based zinc chloride-activated carbons. Furthermore, due to its high adsorption performance for low-molecular-weight compounds, the activated carbon of the present invention can be suitably used as an activated carbon for solution adsorption treatment (particularly, an activated carbon for solution purification).

We claim:
1. A granular activated carbon having the following properties (1) to (4):
    (1) an ignition residue of 2 mass fraction % or less;
    (2) a hardness of 60 mass fraction % or more;
    (3) a mesopore volume of 0.5 mL/g or more; and
    (4) comprising an activated carbon raw material being at least one member selected from the group consisting of coconut shells, natural fibers, synthetic fibers, and synthetic resins.

2. A method for manufacturing a granular activated carbon having a hardness of 60 mass fraction % or more, comprising the following steps (A) to (C) of:
- (A) bringing an activated carbon raw material into contact with a calcium component, wherein the content of the calcium component, which is attached to the activated carbon surface and pores after being brought into contact therewith, in the activated carbon is, in terms of calcium, 0.5 to 2 wt %, wherein the calcium component is at least one member selected from the group consisting of calcium chloride, calcium carbonate and calcium hydroxide;
- (B) activating the activated carbon raw material obtained in step (A); and
- (C) washing the activated carbon obtained in step (B), wherein an activation yield in step (B) is set to 20 to 32.9% and the granular activated carbon has a hardness of 60 mass fraction % or more.

3. A granular activated carbon obtained by the manufacturing method according to claim 2.

4. The manufacturing method according to claim 2, wherein the activated carbon raw material is selected from the group consisting of coconut shells, natural fibers, synthetic fibers, and synthetic resins.

5. A granular activated carbon obtained by the manufacturing method according to claim 4.

6. The manufacturing method according to claim 4, wherein the activated carbon raw material is a coconut shell.

7. A granular activated carbon obtained by the manufacturing method according to claim 6.

8. A method for manufacturing a granular activated carbon having a hardness of 60 mass fraction % or more, comprising the following steps (A) to (D) of:
- (A) carbonizing an activated carbon raw material, followed by pulverization;
- (B) mixing the activated carbon raw material obtained in step (A) with a calcium component wherein the amount of the calcium component is, in terms of calcium, 0.5 to 1.5 parts by weight, based on 100 parts by weight of the pulverized product after carbonization in step (A), wherein the calcium component is selected from the group consisting of calcium chloride, calcium carbonate and calcium hydroxide, followed by molding;
- (C) carbonizing and activating the activated carbon raw material obtained in step (B); and
- (D) washing the activated carbon obtained in step (C), wherein an activation yield in step (C) is set to 10 to 25% and the granular activated carbon has a hardness of 60 mass fraction % or more.

9. A granular activated carbon obtained by the manufacturing method according to claim 8.

10. The manufacturing method according to claim 8, wherein the activated carbon raw material is selected from the group consisting of coconut shells, natural fibers, synthetic fibers, and synthetic resins.

11. A granular activated carbon obtained by the manufacturing method according to claim 10.

12. The manufacturing method according to claim 10, wherein the activated carbon raw material is a coconut shell.

13. A granular activated carbon obtained by the manufacturing method according to claim 12.

* * * * *